(12) United States Patent
Buzzard et al.

(10) Patent No.: US 11,104,370 B2
(45) Date of Patent: Aug. 31, 2021

(54) STEERING COLUMN ASSEMBLY WITH INTEGRATED ENERGY ABSORPTION STRAP

(71) Applicant: Steering Solutions IP Holding Corporation, Saginaw, MI (US)

(72) Inventors: Donald A. Buzzard, Saginaw, MI (US); Michael P. Anspaugh, Bay City, MI (US); Tyler M. Reno, Frankenmuth, MI (US); John F. Schulz, Hemlock, MI (US); Joen C. Bodtker, Gaines, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 75 days.

(21) Appl. No.: 16/552,497

(22) Filed: Aug. 27, 2019

(65) Prior Publication Data

US 2021/0061342 A1 Mar. 4, 2021

(51) Int. Cl.
*B62D 1/19* (2006.01)
*F16F 7/12* (2006.01)

(52) U.S. Cl.
CPC .............. *B62D 1/192* (2013.01); *F16F 7/125* (2013.01); *F16F 7/123* (2013.01)

(58) Field of Classification Search
CPC .......... B62D 1/192; B62D 1/19; B62D 1/195; F16F 7/123; F16F 7/125; F16F 7/128; F16F 7/12
USPC .............................. 280/777; 74/492; 188/371
See application file for complete search history.

(56) References Cited

U.S. PATENT DOCUMENTS

| 7,264,274 B2 | 9/2007 | Ridgway et al. |
| 8,632,098 B2 | 1/2014 | Davies et al. |
| 2015/0069747 A1* | 3/2015 | Sharman ................ B62D 1/192 280/777 |

FOREIGN PATENT DOCUMENTS

| GB | 2247652 A | * 3/1992 | ............. B62D 1/195 |
| JP | 08040287 A | * 2/1996 | |

* cited by examiner

*Primary Examiner* — Keith J Frisby
(74) *Attorney, Agent, or Firm* — Dickinson Wright PLLC

(57) ABSTRACT

A steering column assembly includes a lower jacket assembly extending longitudinally from a first end to a second end and having an energy absorption (EA) plate. The steering column assembly also includes an upper jacket assembly at least partially received within the lower jacket assembly. The steering column assembly further includes an energy absorption strap integrally formed with the lower jacket assembly.

12 Claims, 3 Drawing Sheets

STEERING COLUMN ASSEMBLY WITH INTEGRATED ENERGY ABSORPTION STRAP

BACKGROUND

Currently, many steering column assemblies are equipped with kinetic energy absorption devices to manage effects of an impact event. There are several different types and variations of these kinetic energy absorption devices, typically involving the distortion of metal. Many methods available today use a separate energy absorption assembly that is attached to the steering column assembly.

SUMMARY

According to one aspect of the disclosure, a steering column assembly includes a lower jacket assembly extending longitudinally from a first end to a second end and having an energy absorption (EA) plate. The steering column assembly also includes an upper jacket assembly at least partially received within the lower jacket assembly. The steering column assembly further includes an energy absorption strap integrally formed with the lower jacket assembly.

According to another aspect of the disclosure, an integrated energy absorption strap includes an energy absorption strap integrally formed with a lower jacket assembly of a steering column assembly. The integrated energy absorption strap also includes a cutout of the lower jacket assembly engageable with an engagement tab of an upper jacket of the steering column assembly proximate a leading edge of the upper jacket. The integrated energy absorption strap further includes a roll strap feature.

According to yet another aspect of the disclosure, a steering column assembly includes a lower jacket assembly. The steering column assembly also includes an upper jacket assembly at least partially received within the lower jacket assembly, the upper jacket assembly having a protruding member. The steering column assembly further includes an energy absorption strap integrally formed with the lower jacket. The steering column assembly yet further includes a roll strap feature being integrated with the energy absorption strap. The steering column assembly also includes a clamp bolt engageable with the protruding member of the upper jacket assembly.

These and other advantages and features will become more apparent from the following description taken in conjunction with the drawings.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the Figures, where the invention will be described with reference to specific embodiments, without limiting same, it is to be understood that the disclosed embodiments are merely illustrative of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
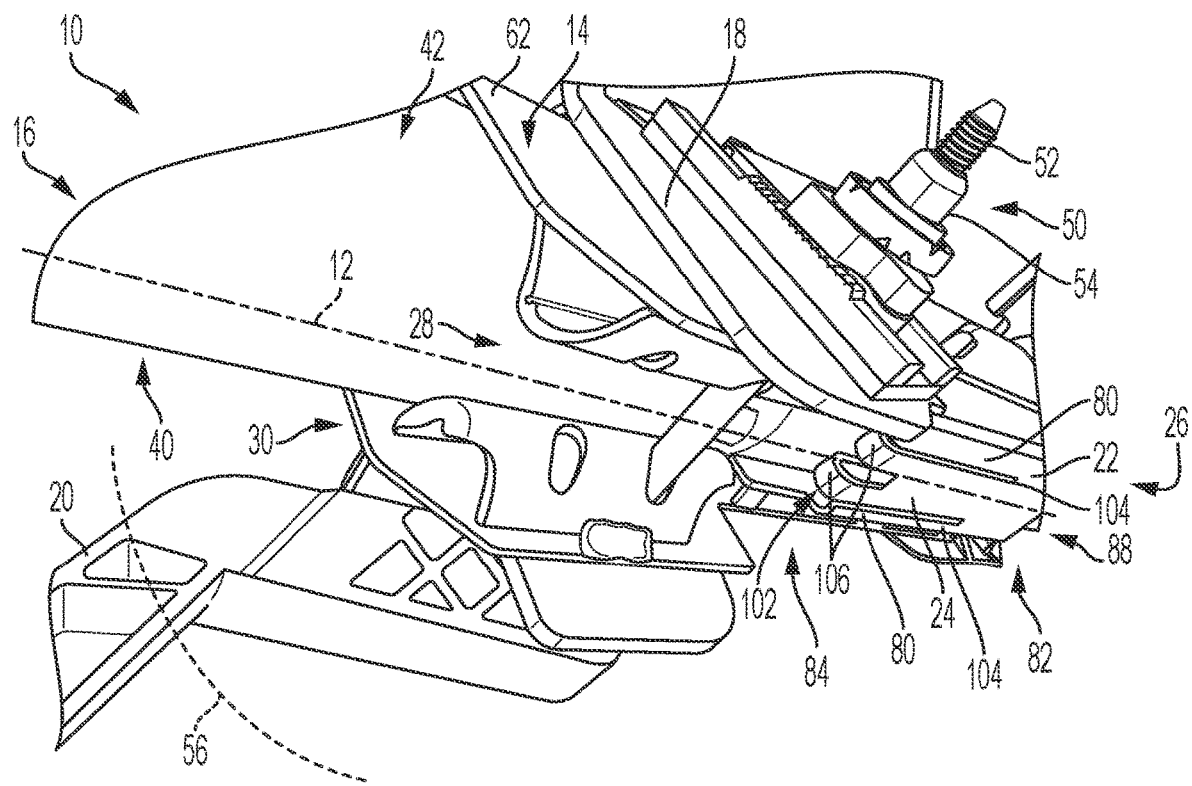
FIG. 1 is a perspective view of a steering column assembly.
Figure 2:
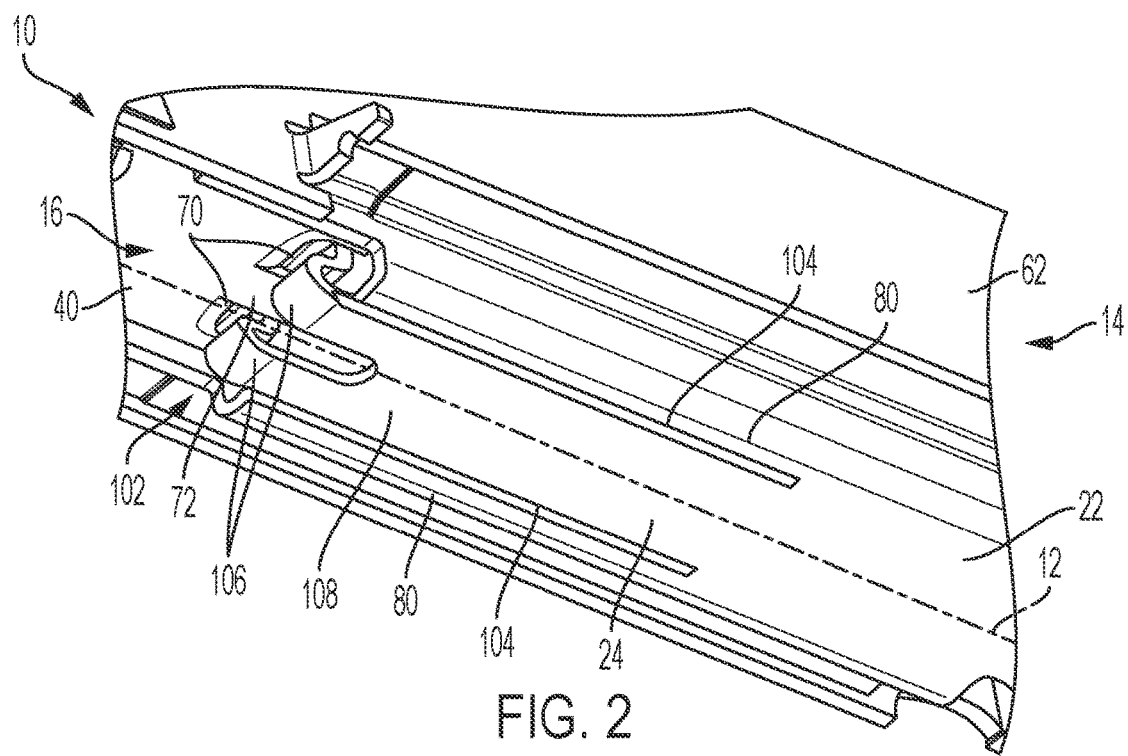
FIG. 2 is another perspective view of the steering column assembly according to one aspect of the disclosure.
Figure 3:
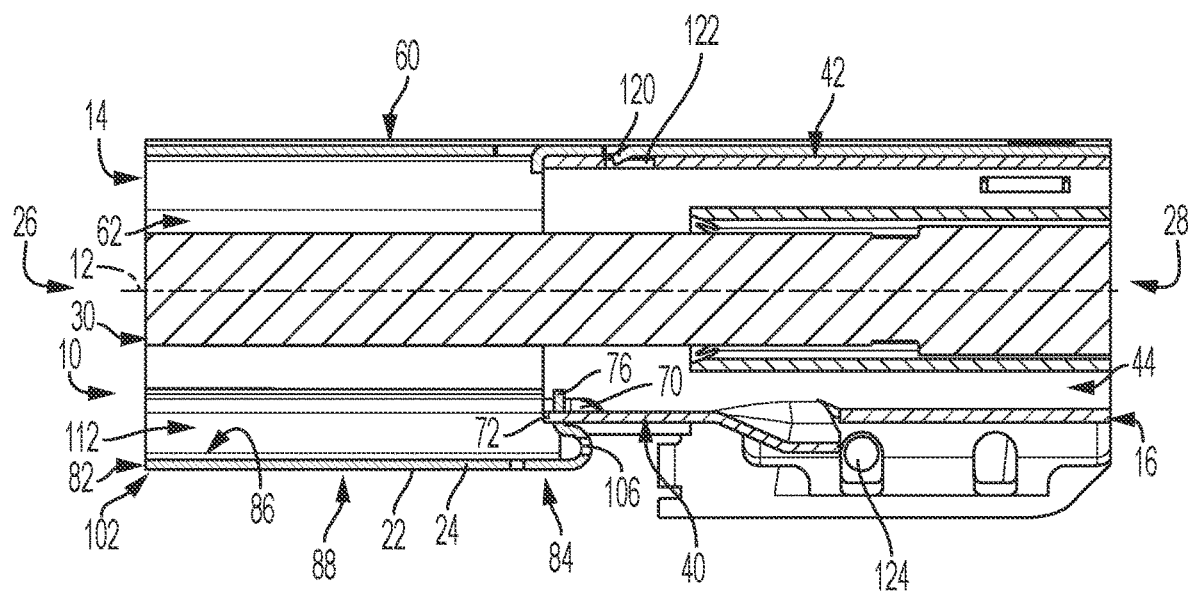
FIG. 3 is a cross-sectional view of the steering column assembly.

Referring to FIGS. 1-3, a steering column assembly 10 is shown. The steering column assembly 10 extends along a steering column axis 12. The steering column assembly 10 is configured as an adjustable telescopic steering column assembly 10 with at least a portion of the steering column assembly 10 being translatable along the steering column axis 12. The steering column assembly 10 includes a lower jacket assembly 14, an upper jacket assembly 16, a mounting bracket 18, an adjustment lever 20, a lower portion of the lower jacket assembly (may also be referred to herein as an energy absorption (EA) plate 22), and an energy absorption (EA) strap 24.

The lower jacket assembly 14 is connected to a vehicle structure (not shown) with the mounting bracket 18. The lower jacket assembly 14 includes a first end 26 and a second end 28. The second end 28 defines an opening 30 that at least partially receives the upper jacket assembly 16.

The upper jacket assembly 16 is translatable along the steering column axis 12 to telescopically adjust a position of a steering wheel (not shown) coupled to the upper jacket assembly 16. The upper jacket assembly 16 includes a lower portion 40, an upper portion 42 opposite the lower portion 40, and two side portions 44 connecting the lower portion 40 to the upper portion 42. The adjustment lever 20 is configured to enable the vertical or pivot movement of the upper jacket assembly 16 relative to the mounting bracket 18 by selectively locking and unlocking the steering column assembly 10. The design shown can be readily configured to enable telescopic or translation of the upper jacket assembly 16 relative to the lower jacket assembly 14 along the steering column axis 12.

The adjustment lever 20 is pivotally connected to at least one of the lower jacket assembly 14, the upper jacket assembly 16, and the mounting bracket 18. In at least one embodiment, the adjustment lever 20 is pivotally connected to the lower jacket assembly 14 and the mounting bracket 18 by a rake bolt 50 that extends through each of the lower jacket assembly 14 and the mounting bracket 18. The rake bolt 50 is secured at an end 52 with a fastening bolt 54.

The adjustment lever 20 is pivotable or movable between a first position (not shown) and a second position (not shown) by an operator of the vehicle. The adjustment lever 20 is pivotable or movable between the first position and the second position about an axis 56 oriented substantially transverse to the steering column axis 12. The first position of the adjustment lever 20 corresponds to a position in which the upper jacket assembly 16 is inhibited from movement or telescopic adjustment relative to the lower jacket assembly 14 along the steering column axis 12 (i.e., locked). The first position maintains the steering wheel, which is connected to the upper jacket assembly 16, in a position stable for driving. The second position of the adjustment lever 20 corresponds to a position in which the upper jacket assembly 16 is permitted for movement or telescopic adjustment relative to the lower jacket assembly 14 along the steering column axis 12 (i.e., unlocked).

The lower jacket assembly 14 includes the EA plate 22, an upper portion 60 opposite the EA plate 22, and two side walls 62 connecting the upper portion 60 to the EA plate 22. The EA plate 22 interfaces the lower jacket assembly 14 with the upper jacket assembly 16 by engaging with an opening 70 in the upper jacket assembly 16 and with an engagement tab 72 of the upper jacket assembly 16. In some embodiments the opening 70 is located on the bottom portion of the upper jacket assembly 16, while in other embodiments the opening 70 may be located on the upper portion 42 or either side portion 44 of the upper jacket assembly 16. The engagement tab 72 is located proximate a leading edge of the upper jacket assembly 16 and engages with a cutout 76 of the lower jacket assembly.

The EA plate 22 also has a pair of lateral portions 80 extending longitudinally from a first end 82 to a second end 84 of the EA plate 22. The EA plate 22 also has a first side 86 that faces inward towards the upper jacket assembly 16 and a second side 88 that faces outward away from the upper jacket assembly 16.

Referring to FIGS. 2 and 3, the energy absorption strap 24 has an offset 108 from the EA plate 22. The offset 108 is located on the first side 86 of the EA plate 22. The offset 108 creates tear lines 104 on either side where the energy absorption strap 24 interfaces with the EA plate 22. The offset 108 also gives rise to a reduced thickness wall 110 in energy absorption strap 24. The reduced thickness wall 110 is located at the interface between the offset 108 of the energy absorption strap 24 and the lateral portions 80 of the EA plate 22. The reduced thickness wall 110 creates a stress riser in which tearing will initiate along the tear lines 104 of the energy absorption strap 24. The depth of the offset 108 can be tuned to achieve the desired amount of dissipated energy.

The energy absorption strap 24 includes a curved portion 106 proximate an end 102 of the EA strap 24 that engages with a loop feature of the upper jacket assembly 16. Under a scenario where energy absorption is required, the cutout 76 of the energy absorption strap 24 of the lower jacket assembly 14 engages with the engagement tab 72 of the upper jacket assembly 16. The energy absorption strap 24 then tears away along its tear lines 104 and rolls up, this feature also referred to herein as a roll strap feature. The roll strap feature occurs inside of a cavity 112 defined by the space between the lower jacket assembly 14 and upper jacket assembly 16 once the upper jacket assembly 16 has been received within the lower jacket assembly 14.

Figure 4:
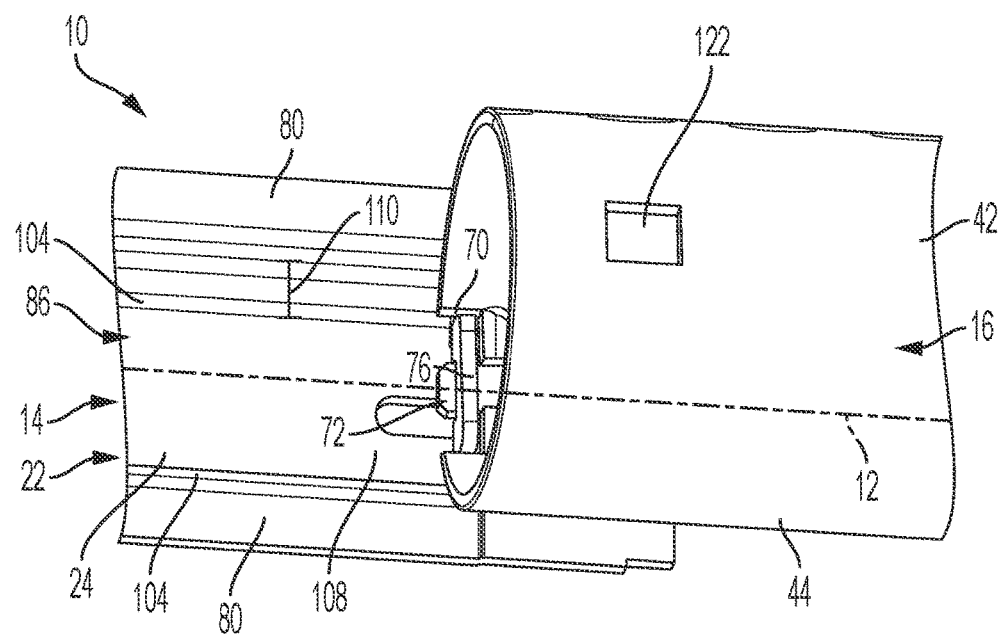
FIG. 4 is a top view illustration of the steering column assembly.
Figure 5:
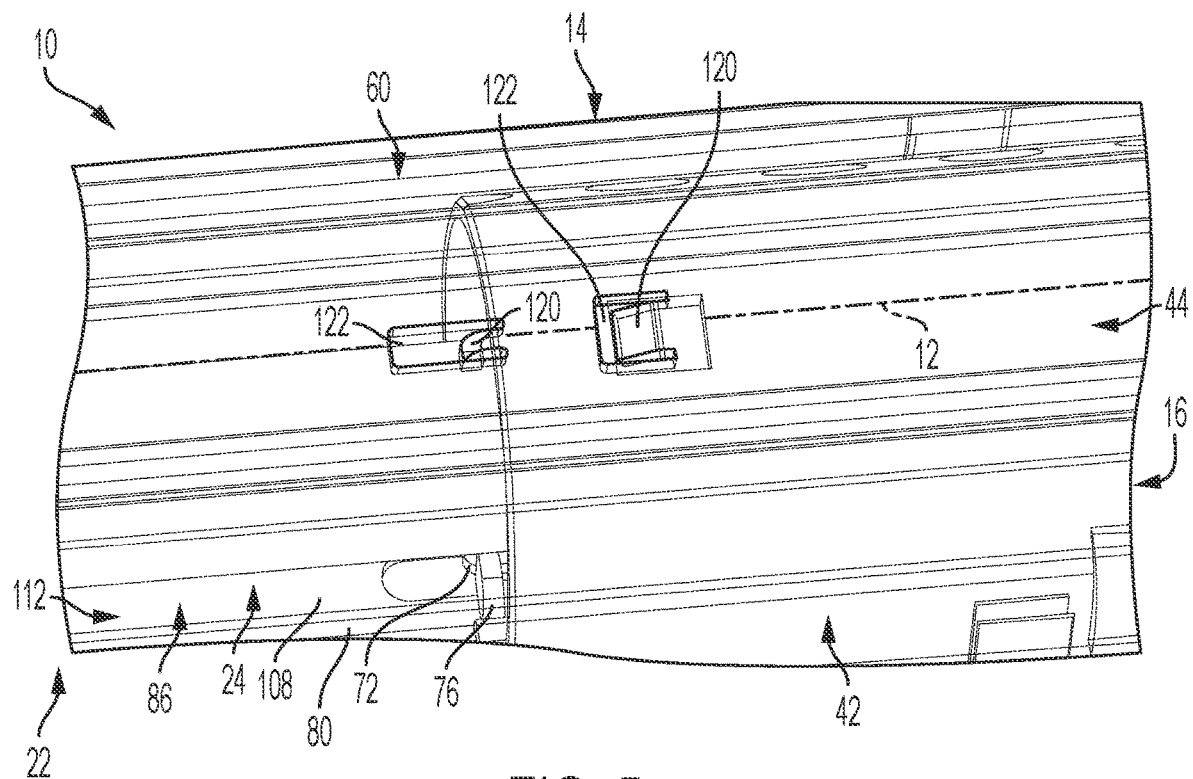
FIG. 5 is partial cross-sectional view of the steering column assembly according to another aspect of the disclosure.

Referring to FIGS. 3-5, in some embodiments the steering column assembly 10 may have an integrated set of breakaway load tabs 120. These breakaway load tabs 120 may be located on the lower jacket assembly 14. In the depicted embodiment the breakaway load tabs 120 are specifically located on the upper portion 60 of the lower jacket assembly 14. In other embodiments the breakaway load tabs 120 may be located on the EA plate 22 or either side wall 62 of the lower jacket assembly 14. These breakaway load tabs 120 engage with a set of breakaway load tab openings 122 of the upper jacket assembly 16. In the depicted embodiment the load tab openings 122 are located on the upper portion 42 of the upper jacket assembly 16. In other embodiments the load tab openings 122 may be located on the lower portion 40 or either side portion 44 of the upper jacket assembly 16. In some embodiments there may be more than one load tab 120 located on the same wall of the lower jacket assembly 14 (see FIG. 5), or multiple load tabs 120 located on different portions of the lower jacket assembly 14 (see FIG. 6). This is also the case for the load tab openings 122 of the upper jacket assembly 16.

Figure 6:
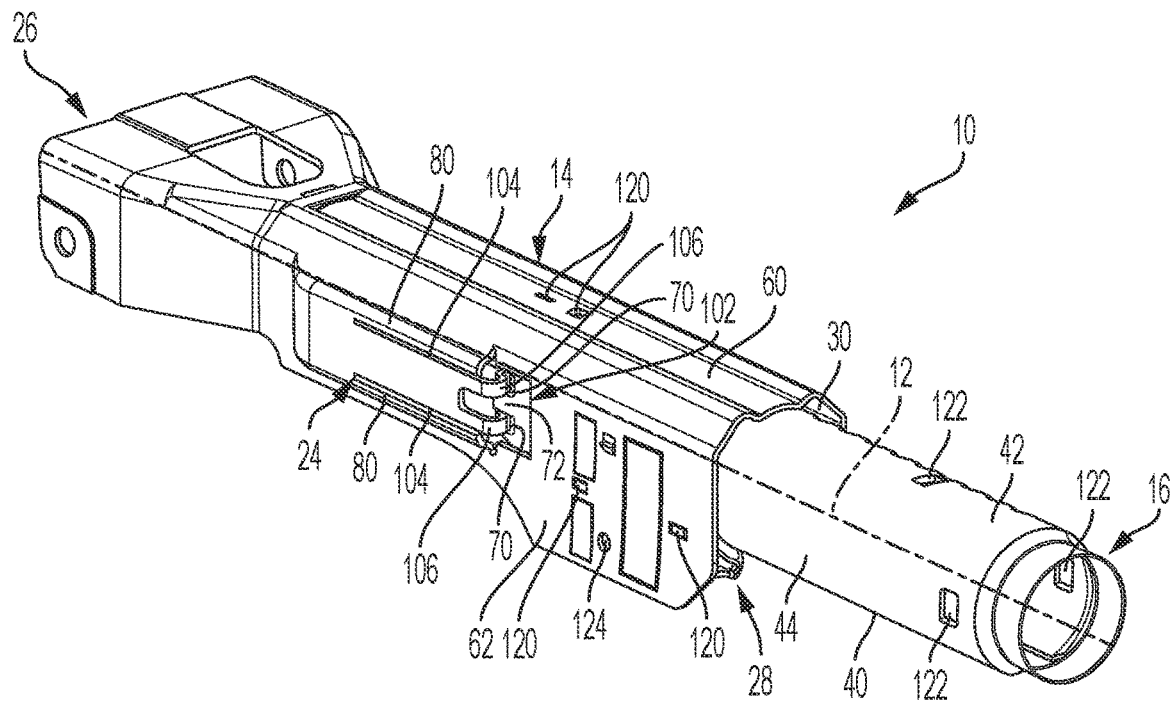
FIG. 6 is a perspective view of a steering column assembly having an integrally formed energy absorption strap located on a side wall of the lower jacket assembly.

There may be more than one load tab opening 122 on the same wall of the upper jacket assembly 16 (see FIG. 5), or multiple load tab openings 122 on different portions of the upper jacket assembly 16 (see FIG. 6). Regardless of the number and location of load tabs 120 and/or load tab openings 122, these features may be used to add breakaway load to the assembly. The tab(s) 120 is for reverse direction positioning of the upper jacket assembly 16 relative to the lower jacket assembly 14 and is configured to add minimal crash direction load.

Along with variations to the placement of the breakaway load tabs 120 and clamp bolts 124, the energy absorption strap 24 may also be located in different locations or fully integrated into the lower jacket assembly 14 based on assembly or manufacturing needs. In some embodiments the energy absorption strap 24 may be located on the upper portion 60 or on the side wall 62 or located opposite of the upper portion 60 and integrating the EA plate 22 EA features into the lower jacket assembly 14 (see FIG. 6).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the present disclosure, it is claimed:

1. A steering column assembly comprising:
   a lower jacket assembly extending longitudinally from a first end to a second end and having an energy absorption (EA) plate;
   an upper jacket assembly at least partially received within the lower jacket assembly; and
   an energy absorption strap integrally formed with the lower jacket assembly.

2. The steering column assembly of claim 1, wherein the energy absorption strap is located on the EA plate and closer to the first end of the lower jacket assembly than the second end of the lower jacket assembly.

3. The steering column assembly of claim 1, wherein the energy absorption strap is located on the EA plate and closer to the second end of the lower jacket assembly than the first end of the lower jacket assembly.

4. The steering column assembly of claim 1, wherein the energy absorption strap is located on a side wall of the lower jacket assembly.

5. The steering column assembly of claim 1, wherein the energy absorption strap includes a roll strap feature.

6. The steering column assembly of claim 5, wherein the roll strap feature includes a tear direction inside a cavity defined by a space between the lower jacket assembly and the upper jacket assembly when the upper jacket assembly is at least partially inserted into an opening of the lower jacket assembly.

7. The steering column assembly of claim 1, wherein the lower jacket assembly has at least one integrated breakaway tab which engages with a breakaway load tab opening of the upper jacket assembly.

8. An integrated energy absorption strap comprising:
an energy absorption strap integrally formed with a lower jacket assembly of a steering column assembly;
a cutout of the lower jacket assembly engageable with an engagement tab of an upper jacket of the steering column assembly proximate a leading edge of the upper jacket; and
a roll strap feature.

9. The energy absorption strap of claim 8, wherein the energy absorption strap is located on an energy absorption (EA) plate of the lower jacket assembly and closer to a first end of the lower jacket assembly than a second end of the lower jacket assembly.

10. The energy absorption strap of claim 8, wherein the energy absorption strap is located on an EA plate of the lower jacket assembly and closer to a second end of the lower jacket assembly than a first end of the lower jacket assembly.

11. The energy absorption strap of claim 8, wherein the energy absorption strap is located on a side wall of the lower jacket assembly.

12. The energy absorption strap of claim 8, wherein the roll strap feature includes a tear direction inside a cavity defined by a space between the lower jacket assembly and the upper jacket when the upper jacket is at least partially inserted into an opening of the lower jacket assembly.

* * * * *